Sept. 5, 1967 E. FREDKIN 3,340,359
HIGH-SPEED FILM READING
Filed April 6, 1964 8 Sheets-Sheet 1
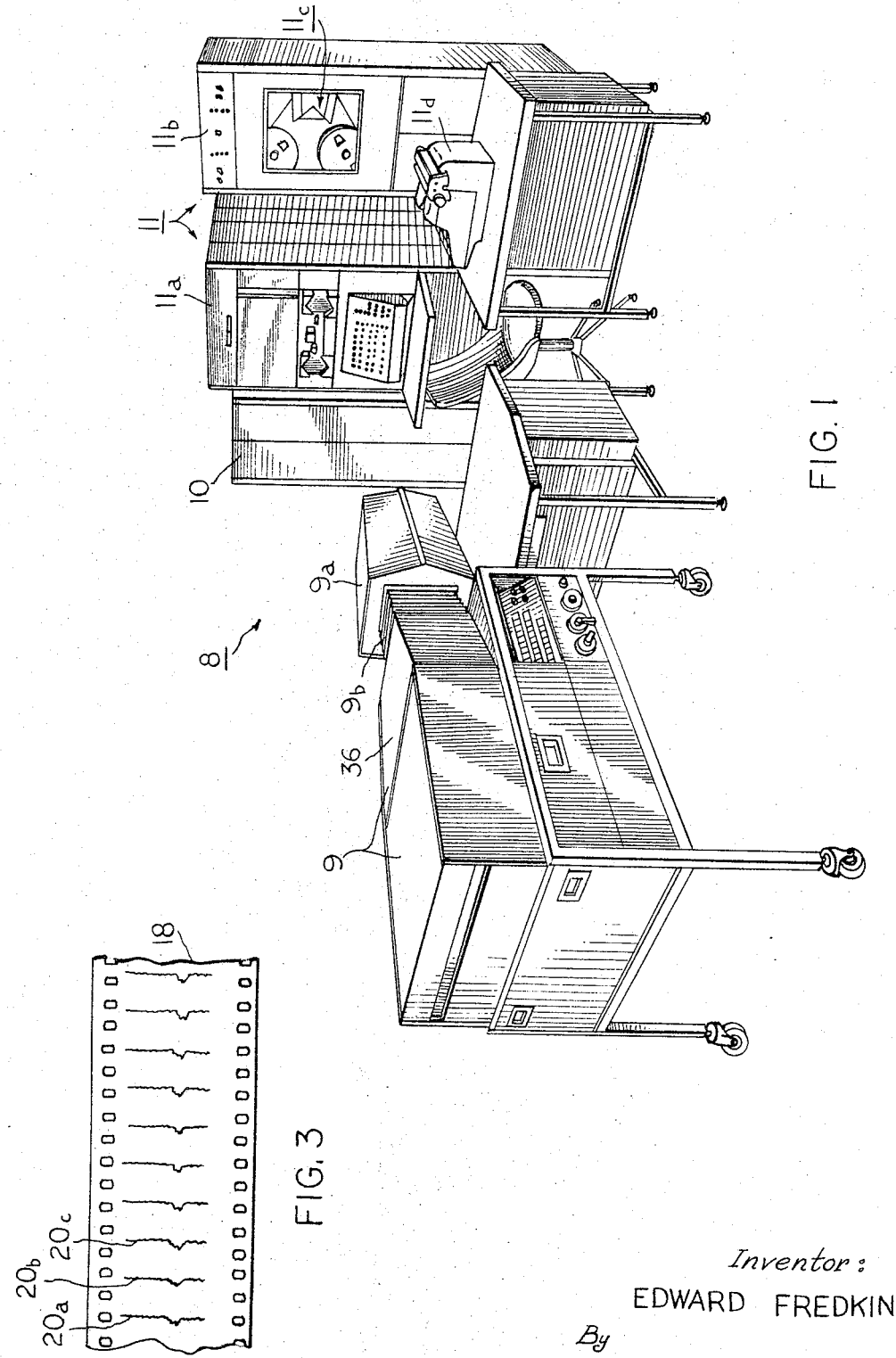
Inventor:
EDWARD FREDKIN
By
Dike, Thompson, Bronstein & Mrose
ATTORNEYS

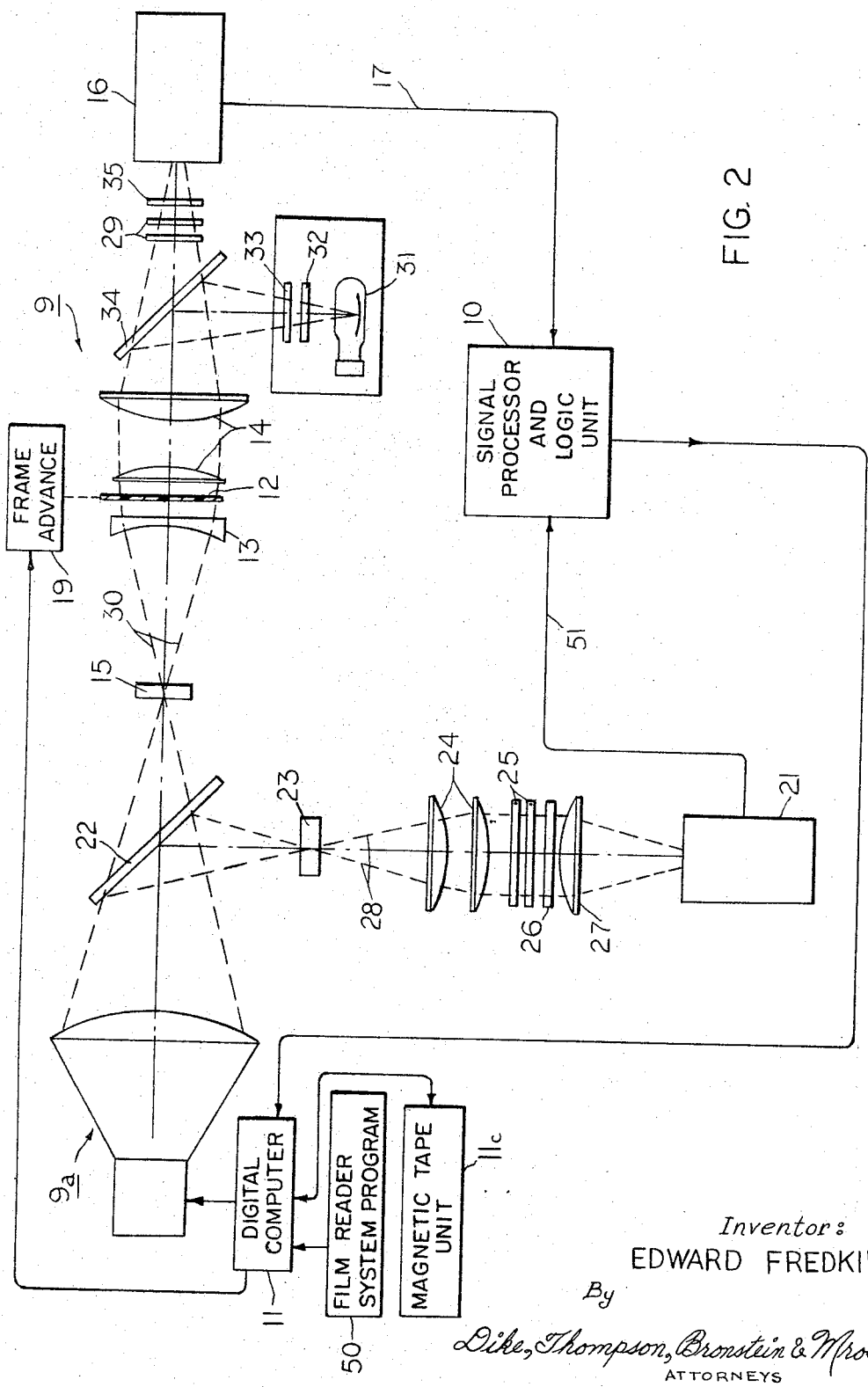

Sept. 5, 1967
E. FREDKIN
3,340,359
HIGH-SPEED FILM READING
Filed April 6, 1964
8 Sheets-Sheet 3
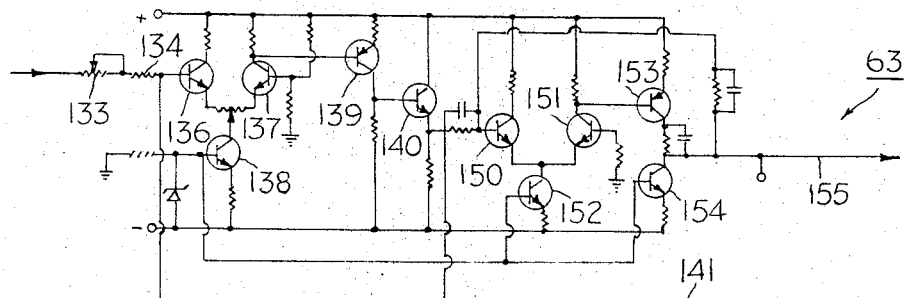
FIG. 6B
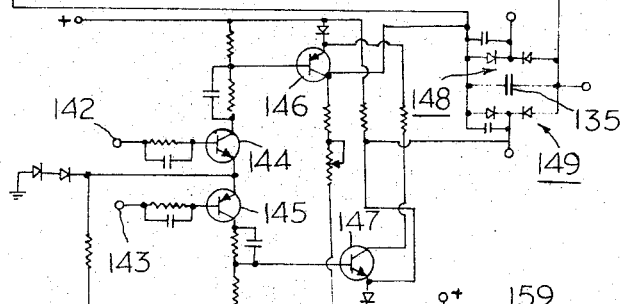
FIG. 6C
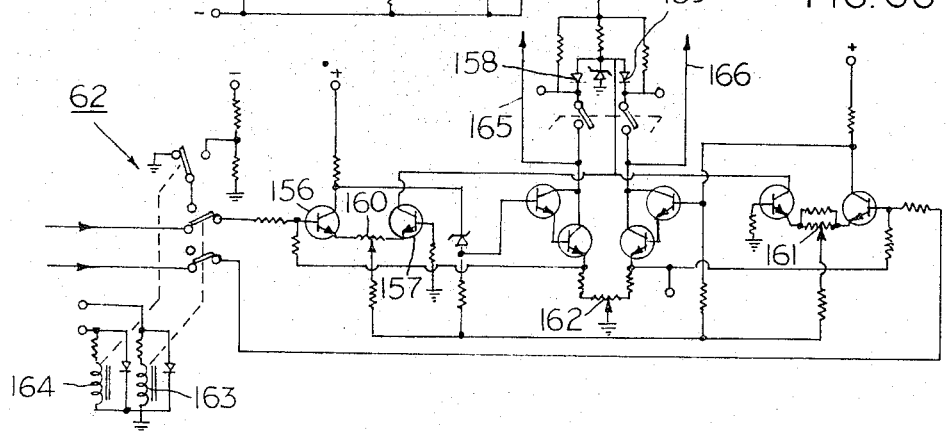
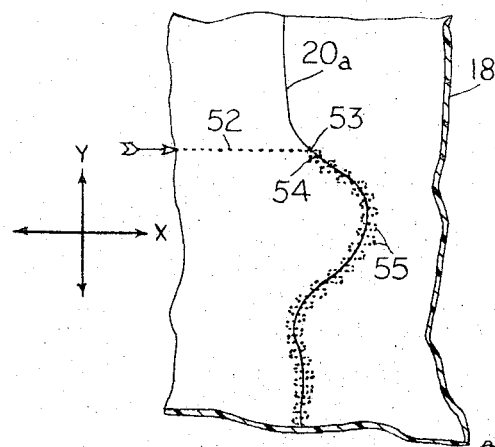
FIG. 3A
*Inventor:*
EDWARD FREDKIN
By
*Dike, Thompson, Bronstein & Mrose*
ATTORNEYS

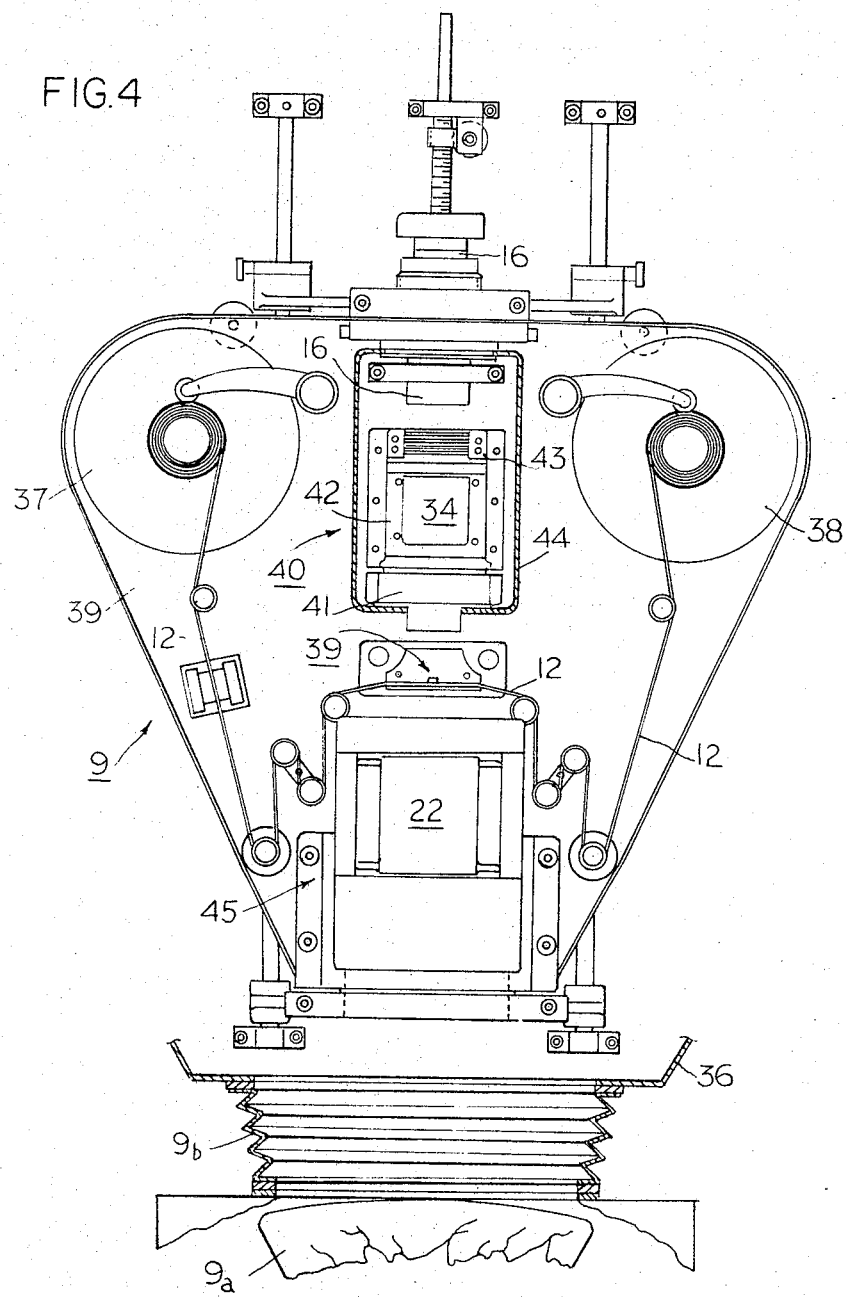

Sept. 5, 1967  E. FREDKIN  3,340,359
HIGH-SPEED FILM READING
Filed April 6, 1964  8 Sheets-Sheet 6

Inventor:
EDWARD FREDKIN
By
Dike, Thompson, Bronstein, & Mrose
ATTORNEYS

United States Patent Office 3,340,359
Patented Sept. 5, 1967

3,340,359
HIGH-SPEED FILM READING
Edward Fredkin, Natick, Mass., assignor to Information International, Inc., Cambridge, Mass., a corporation of Massachusetts
Filed Apr. 6, 1964, Ser. No. 357,700
15 Claims. (Cl. 178—7.88)

ABSTRACT OF THE DISCLOSURE

Film records and the like are examined via the optical scanning light output of a cathode ray tube having its scanning programmed by cooperating digital computer equipment; electro-optical features involving filtering and changes in size of the scanning beam compensate for background conditions on the record and improve precision of automatic reading, and scanning is accelerated through incremental beam-stepping of square-wave pattern.

---

The present invention relates to improvements in automatic reading of film and the like, and, in one particular aspect, to novel and improved apparatus which is programmed to translate visual records into digital language, communicates efficiently with computer equipment at exceptionally high speeds, and provides unique displays and analyses of translated information.

There are numerous areas, in industry, medicine, and government, for example, where vast quantities of data and information in graphical and pictorial form are amassed very quickly but, in turn, can be processed only relatively slowly and laboriously. In many instances, qualitative analyses of these visual records tend to be unsatisfactory because of such factors as record imperfections, high levels of interference, and observer errors. By way of illustration, although it is found that photographic techniques can be exploited to special advantage in obtaining rather fast and economical records of rapidly-changing displays on cathode ray tube indicators, these motion-picture film records may typically accumulate in such enormous lengths as over a mile or so during each mere half hour of display, and certain variations in film densities and in the sharpness of developed images may affect the precision with which information can later be extracted from the film. Visual inspection and point-by-point measurement of each of the images on the multitudinous frames of such long photographic records is exceedingly tiresome and costly, and, being dependent upon human eye sensitivities and acuities of perception, the measurements of variable information recorded against variable backgrounds tend to be subjective and seriously unreliable. Some increase in processing speed has been realized through use of semi-automatic plotting devices which detect and register the coordinates of successive image points across which an operator has positioned a pair of cross-hairs or the like; however, this technique nevertheless remains relatively tedious and, moreover, is imprecise because of its dependence upon unreliable perceptions by human operators. Electronic scanning of the general type employed in television systems suggests itself as an approach which would significantly accelerate the reading processes, although, somewhat suprisingly, even this leaves much to be desired because of times extravagantly wasted in scanning raster areas which are devoid of information. At best, such electronic scanning has promised only relatively crude and uncertain results, because of its inherent inability to discriminate when troublesome density variations occur in the films under evaluation.

In accordance with the present teachings, however, the aforesaid disadvantages of electronic scanning are uniquely circumvented, and extraordinary speed and precision are developed in practical fully-automatic reading systems. For these purposes, the visual records which are to be examined are scanned optically by the light output of a cathode ray tube which generates only such successive points of scanning light as are essential to close investigation of recorded information, the scanning being programmed within associated digital computer equipment. Wasteful losses of time which would otherwise occur and be accumulate during more extensive scanning excursions, short as these may seem ordinarily in the case of a cathode ray tube device, are avoided by relying upon the very much faster logic and control of digital computer circuitry to program the scan only within the narrow limits where it is actually found to be necessary. Further, the optical scanning is rendered substantially immune to common disturbances caused by density variations in the film or other record medium by operation of special optical comparator provisions in the system.

It is one of the objects of the present invention, therefore, to provide novel and improved apparatus for the automatic reading of film and the like at exceptionally high speeds.

Another object is to provide unique ultra-fast and precise electronic translations of visual records into digital form.

A further object is to provide computer-programmed electronic reading and processing apparatus wherein optical scanning of film or other visual records is automatically slaved to detections of recorded intelligence to achieve significant conservations of scanning times.

It is another object to provide improved film-reading apparatus which automatically converts visual records of information into digital data and communicates at high speed with digital computer equipment to produce displays, records, and analyses of information.

Still further, it is an object to provide novel and improved film-reading apparatus which is computer-programmed to translate visual records into digital data automatically at rates governed in large measure by digital computer operating speeds, and which sensitively discriminates against film density variations to resolve and characterize recorded intelligence with outstanding precision.

By way of a summary account of practice of this invention in one of its aspects, each frame of a length of film carrying recorder radar traces is optically scanned incrementally by the light output from successive stepped points illuminated on the screen of a cathode ray tube, as programmed by a computer which impresses the appropriate deflection signals upon the electron beam of the tube and which has cognizance of the coordinates of each such illuminated point. For purposes of accurate discrimination between possible confused conditions when the light is passed through portions of the film which characterize intelligence and through somewhat light-permeable portions of the film which do not bear information, the light output from the cathode ray tube source is first resolved into separate beams by a beam-splitting mirror, and this is then focused sharply for the programmed point-by-point scanning of the film frame under examination. Two photosensitive detectors, such as photomultiplier tubes, independently intercept the light which passes through the film and the light which appears in the other end of the split beams, and their electrical outputs are compared on an instantaneous basis in a logic circuit which determines whether or not they characterize intelligence at each scanned location on the film. The logic circuitry in turn informs associated digital computer equipment of its findings, so that these may be delivered to and stored in digital form on a recording medium such as a magnetic tape. The pattern of electron-beam scan of the cathode ray tube is regulated by the digital computer equipment according to a predetermined simple program which dictates that, once a trace of recorded intelligence on the film is found, the electron beam will be stepped incrementally in a relatively small scanning path on the face of the tube until another detection of intelligence is made, and so on until the recorded trace has been fully explored and the coordinates of substantially all of its points have been established and recorded. The rapidity with which such computer-programmed localized scanning occurs is significantly better than that attainable with the usual full raster scanning of cathode ray tubes, and the film reading is thus accomplished in such shorter periods than would otherwise be possible.

Although the aspects of this invention which are believed to be novel are set forth in the appended claims, additional details as to preferred practices and as to the further objects, advantages and features thereof may be most readily comprehened through reference to the following description taken in connection with the accompanying drawings, wherein:

FIGURE 1 is a pictorial representation of a programmed automatic film reader system constructed in accordance with the present teaching and incorporating equipments which are in modular console form for convenience in installation;

FIGURE 2 provides a partly block-diagrammed and partly schematic illustration of an automatic film reader system such as that portrayed in FIGURE 1;

FIGURE 3 is a fragment of motion picture film bearing traces of information and characterizing one type of visual record which may be processed advantageously at high speed and with an outstanding degree of precision by the automatic reading apparatus shown in FIGURES 1 and 2;

FIGURE 3A is an enlarged fragment of film bearing a trace of information upon which typical programmed incremental optical scanning is superimposed;

FIGURE 4 is a plan view of an improved optical-mechanical unit for the programmed scanning of film, with certain portions cut away in cross-section to expose constructional details;

Figure 5:
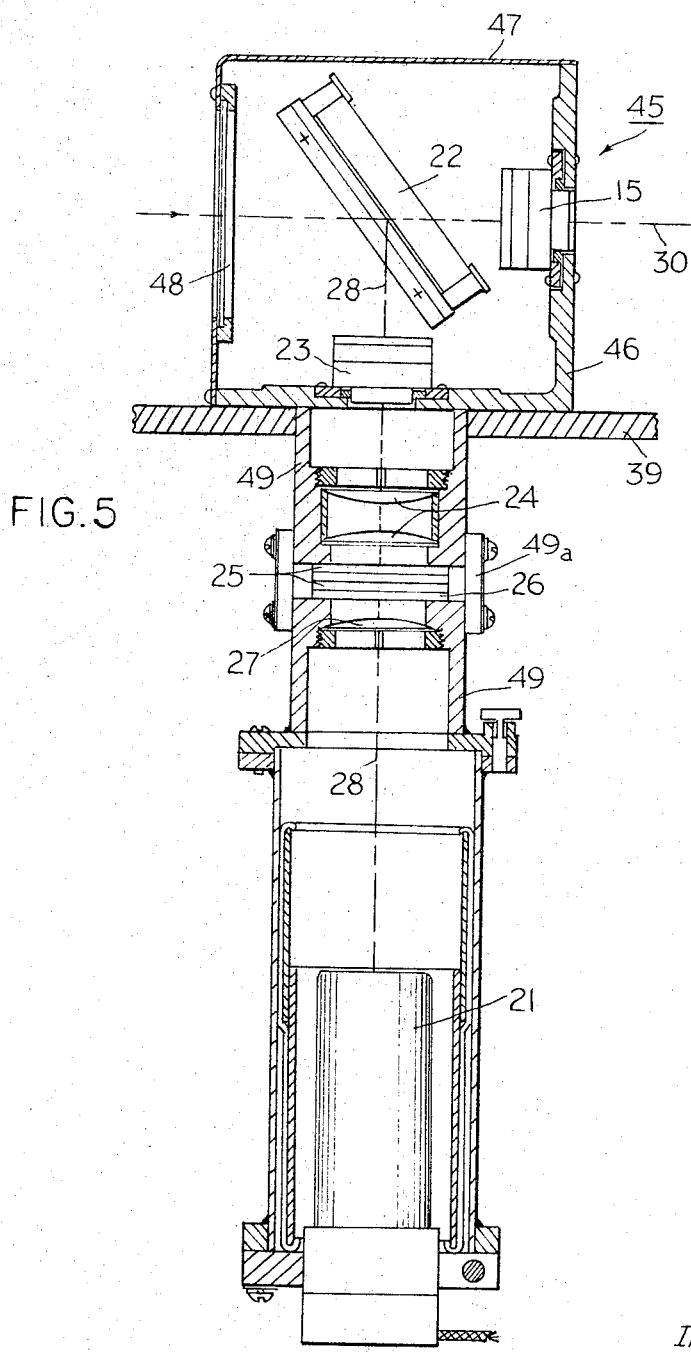
Figure 6:
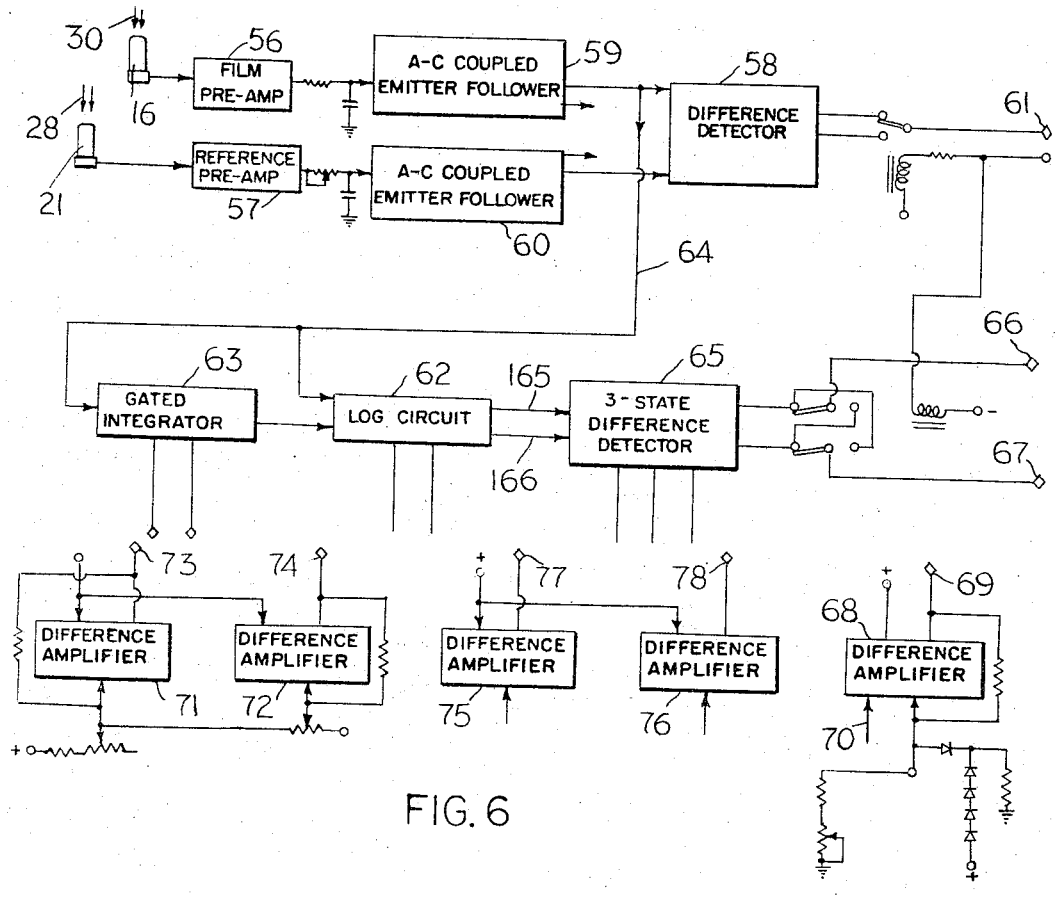
Figure 7:
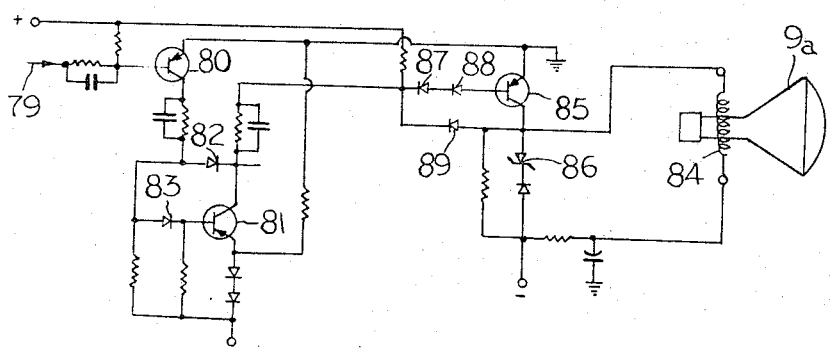
Figure 6A:
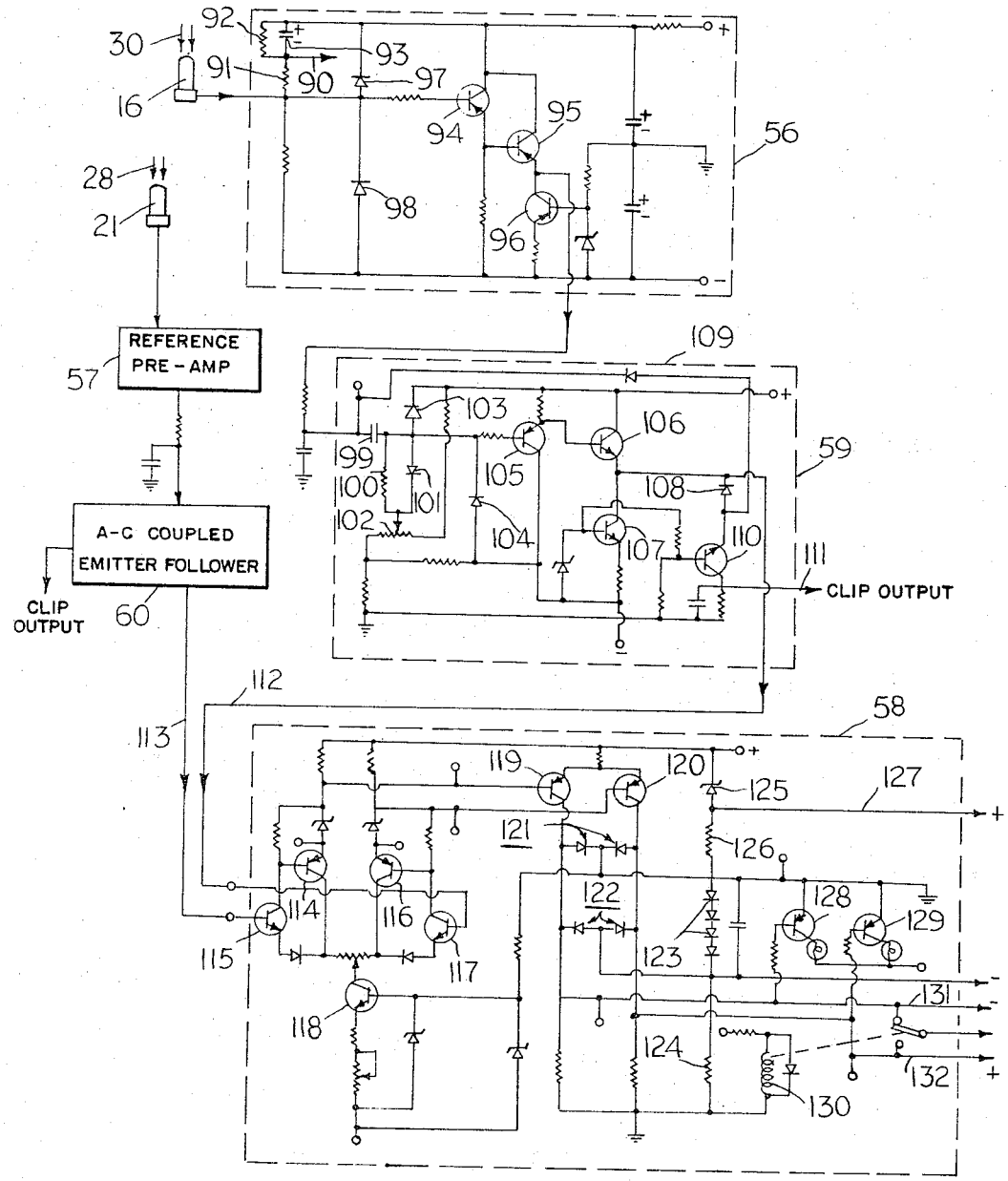
Figure 6D:
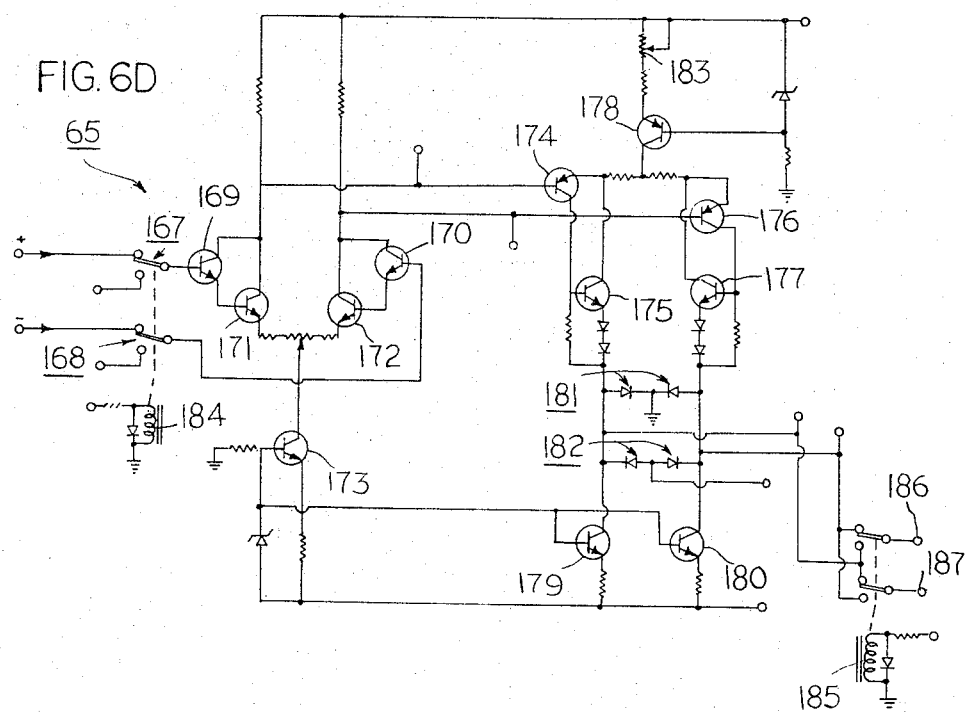
Figure 6E:
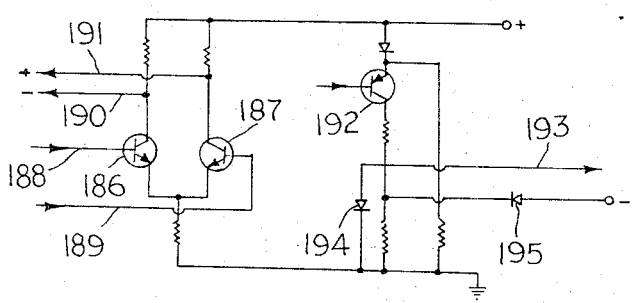

FIGURE 5 provides a side view of a portion of the optical-mechanical unit illustrated in FIGURE 4, including parts cut away in cross-section to reveal internal structure;

FIGURE 6 represents, in block-diagram form, a preferred embodiment of signal-processing and logic network for use in programmed automatic film reading apparatus embodying the present invention;

FIGURE 6A is a partly schematic and partly block-diagrammed illustration of amplifier and detection circuits for use in the network of FIGURE 6;

FIGURE 6B depicts in schematic form a gated integrator circuit for use in the network of FIGURE 6;

FIGURE 6C is a schematic diagram of a log amplifier circuit for use in the network of FIGURE 6;

FIGURE 6D is a schematic diagram of a three-state difference amplifier circuit for use in the network of FIGURE 6;

FIGURE 6E is a schematic diagram of a difference amplifier circuit for use in the network of FIGURE 6; and FIGURE 7 provides a schematic diagram of a modulator-driver circuit for defocussing the cathode ray tube light source of the reader of FIGURES 1 and 2 through a dynamic focus coil of the source.

The programmed automatic high-speed film reading system 8 depicted in FIGURE 1 is conveniently of a modular type including associated units which may be manufactured as separate items and which may then be physically arranged to occupy available installation space in an optimum manner. Principal sub-assemblies are shown to comprise an enclosed optical-mechanical unit 9, a programmed cathode ray tube light source 9a coupled with the optical-mechanical unit by way of a light-excluding bellows 9b, a console 10 including a network of signal processing and logic circuits, and digital computer equipment 11 including consoles 11a and 11b which cooperate with magnetic tape recorder apparatus 11c and a typed instruction output unit 11d. A corresponding system illustration in symbol and block conventions appears in FIGURE 2, where certain portions having functions like those of the system portrayed in FIGURE 1 are identified by the same reference characters. Optical-mechanical unit 9 orients each successive frame of a continuous film 12 at a predetermined position between a field flattener lens 13 and a pair of condenser lenses 14 where it will intercept light which has emanated from discrete points on the screen of a cathode ray tube 9a and which has also been passed through an enlarger lens 15. Depending upon whether the film is a positive or negative, and whether or not light rays from the discrete spot of illumination from tube source 9a at any instant encounter a trace of intelligence recorded on the film, there may be a transmittal of light output through the film to a first photo tube 16, which is preferably in the form of a highly sensitive photomultiplier tube. Electrical output signals from this photomultiplier tube characterize the presence or absence of such light output through the film, and are applied to a signal processor and logic unit 10 via the coupling 17. In the arrangement as thus far described, the film may be optically scanned along any or all portions of a frame by the localized beams of light which are emitted from different points on the face of tube 9a as its phosphor screen is scanned by an electron beam. Photomultiplier tube 16 detects only whether or not any defocussed light impinges upon it, without determining the locus of the film spot being examined at any moment; however, the latter information is related to and characterized by the X–Y deflection signals impressed upon tube 9a at any instant, such that the electrical X–Y coordinates and the electrical output signals in coupling 17 together convey information as to the optical condition of the film at specific sites. Typically, cathode ray tube light source 9a may be of a known commercial construction possessing a raster somewhat over 9 x 9 inches in size and having, in one example, 512 display points which are clearly discernible and distinguishable along each of its X–Y (i.e. horizontal and vertical) deflection coordinates. Deflection, and hence the locus of each illuminated display point, is precisely as prescribed by output signals from electronic data processing apparatus, specifically from the general purpose digital computer apparatus 11. For reasons which have already been alluded to and which are more fully discussed later herein, the electron-beam deflections are not programmed to cause illumination of all possible points within the raster, but, instead, to cause illumination only of relatively few points which prove to be necessary for purposes of searching out and identifying the intelligence information recorded on the film or other medium. Preferably, the medium is light-permeable, as in the case of film, although it may alternatively be reflective and the phototube may then simply be oriented to intercept reflected rather than transmitted light. The latter technique may also be exploited where automatic examinations are being made of objects or specimens other than records such as graphs, films or prints. Processing of continuous film length such as the multi-frame film 18 in FIGURE 3 is particularly advantageous, in that the computer-responsive frame-advance mechanism 19 may automatically position successive frames into the optical scanning site as the frame readings are completed. Traces 20a–20c may characterize a plurality of amplitude vs. time traces which are recorded from an oscilloscope on a single frame, for example, and all of these may be read, in sequence, by the automatic film-reading apparatus before the succeeding frame is advanced into position for reading.

As is represented in FIGURE 2, part of the programmed illumination from source 9a is directed not only upon the phototube 16 associated with the film (or other specimen) under examination but also upon a second phototube, preferably also a sensitive photomultiplier type tube, 21. For the latter purpose, an obliquely-oriented beam-splitting mirror 22 intercepts and reflects part of the source output into photomultiplier tube 21 through a separate path including an enlarger lens 23, condenser lenses 24, neutral density filters 25, dichroic filter 26, and a condenser lens 27. An electrical output signal is thus developed independently by photomultiplier tube 21 whenever illumination from the programmed source 9a is also being directed upon film 12. At those moments when the optical beam scanning the film encounters background film areas which are somewhat translucent, but are of neither the highly transparent nor highly opaque character which signify the presence of a recorded trace or other intelligence in the cases of negative or positive film, both photomultiplier tubes will respond by producing electrical output signals of distinctive relative values (the same, or different). This fact enables an automatic compensation to be made for background film density variations, and thus permits the system to read recorded intelligence precisely and with a high degree of resolution. Otherwise, the signals produced by the film-responsive phototube 16 may tend to be erroneous because of film density variations. Advantageously, the second beam, projected onto phototube 21, develops a reference or standard against which the output of phototube 16 is compared to determine whether the density at any measured point is greater or less than the standard for the existing film background density. Neutral density optical filters 25 in the path of the reference beam 28, and filters 29 of like character in the path of the film-reading beam 30, serve as optical-mechanical means for balancing the output signals from the two photomultiplier tubes.

In making an initial balance, a sample of the film which is to be read is fixed in place, at the position of film 12, and the optical scanning is performed to determine whether or not the background density of the film causes confusion of the background "noise" with recorded intelligence; if so, the operator adjusts the optical filtering in one or both of the paths until the discrimination against such noise is satisfactory. Taking the case of a film having a dark background on which information is recorded as a lighter trace, as one example, the obstruction of light by film-path filters 29 may be adjusted until little or no light reaches phototube 16 when the beam 30 scans the film background, while adequate illumination falls upon that phototube whenever the same beam is coincident with the trace of recorded information. The filtering by filters 25 may be similarly adjusted, so that the reference electrical level of output from phototube 21 is at some predetermined level related to the level of output of phototube 16 when the film background is being scanned. This reference output is compared with the instantaneous electrical outputs of phototube 16, in the signal processing and logic unit 10, to determine with certainty and to characterize clearly the occasions when intelligence is detected. In some instances, a broad and coarse trace, which itself varies in density, may thus be effectively sharpened and more distinctly resolved, as by adjusting filters 25 so that the reference output level from tube 21 is slightly higher than that obtained from tube 16 while the background is being scanned, and by accepting as readings only those outputs of tube 16 which prove to be of a yet higher level. The reverse practice aids in detecting more faintly defined intelligence. Opposite filtering adjustments enable similar improvements to be realized when the film traces are dark, against a lighter background. These techniques permit predetermined dark or light levels of film or other specimen patterns to be explored to the exclusion of other information which may be present at either darker or lighter levels.

For purposes of a visual comparison between the information as it is being read and the information as it is recorded on the film, a projection system is also incorporated into the optical-mechanical assembly 9. This system includes a projection lamp 31 and heat and dichroic filters, 32 and 33, respectively, as well as the obliquely-disposed dichroic mirror 34, and the dichroic filters 35 and 26 in the paths of the film-reading and reference beams 30 and 28, respectively. When lamp 31 is energized, its light output through filter 33 is of a distinctive spectral value different from that of beams 28 and 30, and is selectively prevented from influencing either of phototubes 21 and 16 by their respective dichroic filters 26 and 35. However, this distinctively-colored light output in beam 36 is reflected to and through the film 12 by mirror 34, and is caused to project an enlarged image of the information recorded on film 12 onto the screen-like face of cathode ray tube 9a, through the very same lens system which serves the optical scanning purposes. This image, of a prescribed spectral value, is readily distinguished visually from the illumination originating on the face of the tube due to electron beam impingements. The programmed scanning operation causes the tube 9a to develop an illuminated approximation of the trace read from the film, and the observer may view and compare this with the projection of the same trace appearing on the same screen. Preferably, such viewings are made through a suitable window in an otherwise light-tight enclosure for the optical assembly, and adjustments can then be made of the filters and other portions of the system to insure that the system is reading the film in a desired manner. Alternatively, the cathode ray tube may be excited in accordance with known techniques to play back information which the system has read and recorded earlier, in its magnetic tape unit 11c, for example, such that the previously recorded data may be compared visually with the film information projected onto the screen formed by the face of tube 9a. Such played-back information may be of better definition that the information originally read from the film and, if desired, may be recorded on unexposed film which is merely substituted for film 12 in the existing system.

The FIGURE 4 plan view illustrates constructional features of certain portions of a preferred embodiment of the optical-mechanical assembly 9, with the light-tight cover 36 (FIGURE 1) being broken away. Film 12 is transported between spools 37 and 38 to present successive frames at the reading position 39, as dictated by the frame-advance mechanism which controls operation of motors (not visible in the illustration) driving the film spools on the mounting plate 39. Phototube 16 is shown to be adjustably supported in position to intercept the light beams passing through film 12; intermediate these elements there is disposed on optical sub-assembly 40 in which the condenser lens unit is held in mount 41, dichroic mirror 34 is fixed on bracketing 42, and the filters (29 and 35 in FIGURE 2) are mounted in a holder 43. A cover 44 for this sub-assembly shields light which might otherwise be scattered within the confines of the outer cover 36. The film-reading beams from the face of programmed light source 9a are brought to the film through the light-tight flexible bellows 9b and through a sub-assembly 45 which includes a beam-splitting mirror 22. A side view of this sub-assembly, in FIGURE 5, illustrates its association with the elements which respond to the reference light beams. Framework 46 supports the lenses 15 and 23 interposed in the paths of the film-reading and reference beams 30 and 28, respectively, and is otherwise closed by a cover 47 including a window 48. Downwardly-depending tubular support 49 mounts the photomultiplier tube 21 and the associated lenses, and is provided with an intermediate section 49a which receives filters interposed in the reference beam path.

Ultra-rapid reading is made possible by automatically restricting the optical scanning principally to those areas of film (or the like) which are found to contain the desired information. For these purposes, general purpose computer 11 is programmed to excite the display tube 9a such that its electron beam will develop successive points of light in a scanning program which eliminates the need to scan across the full raster once a point of information has been detected on the film under examination. In FIGURE 2, block 50 represents the film reader system program used to develop the improved logic-controlled scanning, and it should of course be understood that the general purpose computer and assocciated display scope 9a are of known constructions which are not represented here as novel per se and which may be used and operated in accordance with the present teachings by those skilled in the art without need for detailed descriptions here concerning their construction and modes of operation. By way of example, the computer may be the high-speed solid-state digital device manufactured by Digital Equipment Corporation with the designation "PDP–1"; this equipment is designed to operate with multiple forms of input-output devices with no internal machine changes, and is a single-address stored-program computer. The display tube, used as the light source in the present system, may conveniently comprise the sixteen-inch Type 30 tube manufactured by Digital Equipment Corporation. Comparable devices of other manufacturers may be used, of course. In a conventional manner, the program prepared for scanning control by the digital computer is recorded (as on punched paper tape, for example) and is then loaded into and stored in the program equipment 50 serving the digital computer 11 which calls the program into operation as necessary. The basic scan program involves first, a progressive point-by-point scanning along one axis, such as the horizontal or X axis of the light source 9a, at some position corresponding tor the related film position where a substantially continuous trace of information may be expected to be located. Once the trace is found by the scanning beam 30, the photomultiplier tubes 16 and 21 deliver characterizing outputs to the signal processing and logic unit 10 via the couplings 17 and 51 and the computer 11 is immediately caused to store both the X and Y coordinates of the first-discovered trace point for access as a reference in subsequent scanning. This initial portion of the programmed scanning, in the X direction, is identified by reference character 52 in FIGURE 3A, 53 being the first-discovered trace point on trace 20a of film 18. Subsequent scanning proceeds on an incremetal basis; that is, the electron beam, and hence the resulting sharp optical beam, is subsequently programmed to search out the whereabouts of the next-successive points on the trace by being stepped point-by-point along predetermined course which involves searching in both the X and Y directions and which is certain to encounter the trace if in fact the trace continues from the point last discovered. Referring to the illustration in FIGURE 3A, for example, the scanning is first progressed a predetermined number of points to the right, from trace point 53, and is then minutely progressed a predetermined number of points downwardly in the Y direction, and is then minutely progressed a predetermined number of points to the left in the X direction, the last number of points to the left in the X direction, the last sequence being sufficient to carry the scanning beam a predetermined number of points further to the left than the X position of trace point 53. In the course of this prescribed increment of scanning, the next significant point, 54, of the trace 20a is discovered and is evidenced by characterizing outputs of the two phototubes. The coordinates of this next significant point are recognized by the computer and are immediaetly stored in digital form; the scanning continues minutely in the same sense as in said last sequence (i.e., right to left) for a predetermined number of points, then downwardly in the Y direction, then to the right in the X direction, then downwardly, and so on until no further trace points are discoverable or until the bottom of the film frame is reached. The prepared program for this particular version of incremental scanning is written such that a square-wave form of scanning path 55 is followed about the trace 20a as a base line. Each cycle of the square-wave scanning is interrupted automatically by the computer when a trace point is located and the program for the illustrated type of scanning then immediately causes the scanning to resume in a manner carrying on the cyclic pattern from that trace point as a new origin or reference. Having in mind that the incremental scanning was begun at some first-discovered trace point, it ultimately becomes necessary for the scanning to return to this point after no further trace points are discovered in the downward direction, or after the bottom of the film frame is reached. Accordingly, the program written for the scanning, and stored in the automatic programming equipment for the computer, then automatically returns the scanning beam to the first-discovered point and carries on the incremental scanning in the upward direction until the trace disappears or until the top of the film frame is reached. Inasmuch as only relatively few points need be visited using the incremental scanning practices, and because the computer electronic control of such incremental scanning involves such incredibly fast action, the total time required for the reading of a film frame is only a minute fraction of the time which would be required were all points on the raster to be visited. This is true even though one film frame carries a number of traces, such as traces 20a–20c (FIGURE 3). In the latter type of situation each trace is successively scanned, incrementally, to record its coordinates; for example, when trace 20a is fully scanned, the program may simply call for the scanning beam to return to point 53 (FIGURE 3A) and then to move point-by-point to the right until the second trace 20b is located, and so on. An alternative program may conveniently call for the initial scanning 52 to extend fully across the frame, locating a first point for each trace, after which these first points are taken as a reference in performing the incremental scanning of the various traces. Those skilled in the art will recognize that there are other programs which may be written to achieve satisfactory incremental scanning, and that this is not to be considered restricted to the square-wave type. By way of example, of an alternative, each trace point which is discovered may serve as the starting point for a point-by-point scanning about a minute square loop, whereby the other trace points are certain to be discovered. It should be understood, of course, that practice of these teachings is not limited to those instances when the information being read is of the specific trace type shown in FIGURES 3 and 3A; any substantially continuous patterns, such as those appearing on X-rays, fingerprints, and so forth, may be read at extraordinarily high speeds with the aid of incremental scanning.

The network illustrated in FIGURE 6 includes components of the signal processing and logic unit 10 (in FIGURE 2) in association with the film-reading and reference photomultiplier tubes, 16 and 21, respectively. A suitable program written into the computer causes the cathode ray tube light source to scan and to produce light beams 30 and 28 in the two optical paths of the optical-mechanical unit 9. These light beams excite the photomultiplier tubes 16 and 21 into delivering characterizing electrical output signals to preamplifiers 56 and 57, and these in turn apply related electrical signals to the difference detector 58 through transistorized AC coupled emitter followers 59 and 60, respectively. Difference detector 58 performs a comparison between the electrical signals resulting from the light acted upon by the film, or other appropriate specimen, and the light which has been split and passed along the reference path. If, for example, the density of the film at a scanned point is greater than the reference density (i.e. than the density of filtering elements placed in the path of the reference beam), this characterizes the condition of information being recorded on negative film, and the electrical output derived from phototube 16 will be smaller than the output derived from phototube 21. The logical comparison of these outputs by difference detector 58 signifies that information is present at the scanned point, and an electrical "0" bit output signal applied to computer terminal 61 informs the computer 11 of this fact so that its control program will factor that information into the further programming. Detection of phototube signals in a different relationship to one another results in a different or "One" bit signal to the computer, so that the computer will be informed there is no intelligence at the scanned point. Typically, the signals from preamplifiers 56 and 57 may be in the range of a few tenths of a volt to about ten volts, and the emitter follower circuits remove DC components from the signals to restore their base lines to a ground potential. In the case of positive film, a "One" bit signal is transmitted to the computer when information is discovered by the scanning, and a "0" bit signal is transmitted for the opposite condition.

In addition to the density comparisons effected by the signal processing and logic unit, as thus far described, equipment is also provided for effecting certain warnings and for determining local contrast conditions. The latter conditions are of special interest where the film or other specimen being read contains information which may be expressed in terms of non-uniform densities, rather than in terms of a sharply-defined trace or the like. Such is likely to be the case with X-ray images, for example, where important information is recorded at different film-density levels. For purposes of identifying and responding to the information in records of non-uniform density, a so-called "dot-blob" technique is employed, this being a technique which involves focussing and de-focussing of each point in the scan to provide an indication of film contrast conditions in the immediate vicinity of each scanned point. The signal processing and logic unit permits operation of the system in a "local contrast" mode by comparing the value of a signal obtained via the film-reading path (beam 30) when a single small spot or "dot" is generated by programmed light source 9a with the average integrated value of a signal obtained via the same path when a larger circular disk of light, or "blob," is generated concentrically with the "dot." In more refined versions, where still further information is desired, consecutive yet-larger "blobs" may also be generated at each scanned point, with a corresponding increase in the number of logic levels which can be evolved. In operation, each programmed command for display of a point on the raster of tube 9a is soon followed (a few microseconds) by a programmed command that current in the winding of a focus coil for cathode ray tube 9a be first increased to cause the display spot to become defocussed by a predetermined amount and be then decreased until the display is refocussed from an enlarged blob into a small dot. Because the raidant energy from tube 9a is essentially constant over the focus-to-defocus range, the signals from film-reading photomultiplier tube 16 should be substantially uniform during the dot-blob cycling if the film density is uniform over the minute area being evaluated. Corresponding electrical output signals are applied to the log amplifier circuit 62 and to the gated integrator 63 via coupling 64 leading from the output of emitter follower 59. Amplifier 62 is a two-channel circuit which has a logarithmic transfer function accommodating a wide dynamic range of input voltages, both directly from the emitter follower 59 and from the gated integrator 63. The latter circuitry is gated by the command signals which cause the spot enlargements or blobs, and is a noperational integrator. The log film-path signal and integrated log film-path signal are coupled into a three-state difference detector 65 which has three stable states. If both inputs from circuit 62 are equal in amplitude, no difference is detected, and an output is applied to the computer signifying this fact. Whenever one of the inputs exceeds the other, and further exceeds a selected threshold setting, the detector applies a characterizing "greater than" or "less than" signal to the computer. Preferably, the end of the gating command signal is caused to produce a pulse which triggers the signals from detector 65 into the computer. The principles upon which this array in the signal processing and logic unit operate are based in part upon the fact that the focussed and unfocussed spots should produce the same effects in the system when the film area investigated is of uniform density. If an area of greater density, such as a trace line, intersects the unfocussed spot (blob) but not the smaller spot (dot), a characterizing "greater than" or "point bright" signal is applied to the computer via terminal 66. In such a case, the signal generated during the period when the spot was unfocussed would have a discontinuity caused by intersection of the enlarging spot with the trace line, and the integrated output from circuit 63 would not reach the same value as it is otherwise capable of reaching. If the trace line also intersects the focussed spot (dot), a characterizing "less than" or "point dim" signal is applied to the computer via terminal 67. In such a case, the signal generated during the period when the spot was unfocussed would also be less than otherwise possible, but the resulting decrease in signal amplitude when the spot (dot) was focussed would be significantly greater, and the difference detector 65 would thus signal a "point dim" condition. Advantageously, the density measurements are relative, rather than absolute in comparison with a given standard, and compensation is automatically effected for films with different background densities. The output information obtained in this way informs the computer when the exact center of a trace is found, so that edges of traces will not be taken as the locus of the center. Alternatively, the computer is enabled to recognize and characterize the patterns of information at different density levels. The signals applied to the computer as a result of these comparisons may be factored into the programming in accordance with known techniques, that is, the written and stored computer program may simply be called upon to recognize and command certain actions whenever "point bright" or "point dim" outputs are present.

Malfunctioning in critical respects is also signalled by feeding the computer with signals which automatically trigger suitable cut-out relays and visual warning indicators, such as lamps, on its maintenance control panel. Difference amplifier 68, for example, delivers such signals to computer warning-circuit terminal 69 wherever a cadmium sulfide (or similar) photocell which is responsive to ambient light within the cover for optical-mechanical unit 9 excites the input lead 70 in a manner signifying that excessive ambient light is present there. Similarly, the difference amplifiers 71 and 72 compare the high voltage high and low levels, respectively, in the optical-mechanical unit 9 with pre-set references, to supply the computer warning circuit terminals 73 and 74 with excitation signals when necessary. Difference amplifiers 75 and 76 function in like manner to apply warning excitation signals to terminals 77 and 78 whenever the photomultiplier anode voltages are found to vary in relation to pre-set references.

The aforementioned defocussing of tube 9a for purposes of the "dot-blob" or "local contrast" mode of operation may be accomplished by a focus modulator driver such as is depicted in FIGURE 7. Defocus pulses derived from the computer as the result of commands by the computer program are applied to input lead 79 and, thence, to an inverter transistor 80. Transistor 81 is the output driver, and is prevented from saturating by diodes 82 and 83. Defocus coil 84 is driven by the power transistor 85, which switches one end of the coil to ground during the defocus interval. During this interval, the current in coil 84 increases exponentially; at the end of the defocus period, transistor 85 is turned off and the current in coil 84 decreases exponentially for a like period.

Diode 86 limits the coil voltage upon reversal of its current, and diodes 87–89 prevent transistor 85 from saturating.

In FIGURE 6A, specific circuits for suitable photomultiplier preamplifiers, AC emitter followers, and a difference detector are exemplified. Preamplifier 56 accepts input from the anode of phototube 16, and an anode warning voltage output to one of difference amplifiers 77 and 78 (FIGURE 6) appears in its output lead 90 from a network of resistances 91 and 92 and capacitor 93, which detects increases in anode current. Transistors 94 and 95 are in a Darlington emitter follower circuit relationship, and transistor 96 is a constant-current emitter load; diodes 97 and 98 protect input transistor 94 against high voltage transients from the photomultiplier.

Emitter follower 59 receives the output of preamplifier 56, this being in the form of negative signals superimposed upon a DC level, and the circuit elements 99–101 form an AC coupling and DC restoring circuit. Potentiometer 102 sets the restoring voltage, typically to zero volt; diodes 103 and 104 are protective diodes for transistor 105 which is in a Darlington emitter circuit relationship with transistor 106, and transistor 107 provides a constant-current emitter load. Diodes 108 and 109 couple signals to transistor 110; if the signal level exceeds the voltage set at the base of 110, this transistor conducts and a clip output signal appears on lead 111 to indicate that the limits of linear operation of the preceding circuitry have been exceeded. Output signals in lead 112, and in the corresponding lead 113 from the companion emitter follower 60, are brought into the difference detector 58, where the transistor pairs 114–115 and 116–117 comprise the input differential preamplifiers served by a common constant-current emitter load transistor 118. Outputs from the difference preamplifier stages are coupled to the output difference amplifier transistors 119 and 120. Diode pair 121 clamps the output to ground, and diode pair 122 clamps the output to a prescribed small negative voltage level set by diodes 123 and resistor 124. Diode 125 and resistor 126 establish a voltage reference, in lead 127, for the differential amplifier warning detectors 68, 71, 72, 75 and 76 (FIGURE 6). Transistors 128 and 129 drive indicator lamps which characterize the two difference states detected. Relay 130 is a polarity-reversing relay for changing the sense of outputs in leads 131 and 132 for the different conditions when positive and negative films are being read.

FIGURE 6B represents a typical circuit arrangement for gated integrator 63. Potentiometer 133 and resistor 134 form the integrating resistors and a gain control, and element 135 is the integrating capacitor. Transistors 136 and 137 are a differential pair, with transistor 138 as a constant-current emitter load. The output from transistor 137 is coupled to transistor 139 which inverts and couples to emitter follower 140; output from 140 is coupled to integrating capacitor 135 via lead 141. Intensify gating and inverted intensify gating signals are applied to terminals 142 and 143, respectively, from the computer circuitry; transistors 144 and 145 are gate inverters, and transistors 146 and 147 are drivers. Diode bridge sections 148 and 149 are excited by these driver transistors. During the intensify pulse period, the diodes in 148 and 149 are turned off, allowing capacitor 135 to be charged, and these are subsequently turned on to discharge the capacitor at the end of the intensify period. Transistors 150–154 form a unity gain operational inverter, delivering an output into lead 155; transistors 150 and 151 are a differential pair with the constant-current emitter load 152, and transistor 153 is an inverter associated with the constant-current source 154 which adjusts the output to a zero level.

Log amplifier 62 is essentially a two-channel current amplifier with a common output amplifier for gain balance. Transistors 156 and 157 are a differential pair, and these are coupled to a Darlington current amplifier. Diodes 158 and 159 are a matched pair having good log characteristics over a wide dynamic range. Current balance in the diodes is attained through adjustment of potentiometers 160 and 161, and gain balance of the output amplifiers is attained through adjustment of potentiometer 162. Relay 163 switches the inputs to a common test signal, and relay 164 switches in a test signal of either a ground or predetermined negative value, for adjustments of the log diode currents and gain balance. Outputs appear in couplings 165 and 166.

Three-state difference detector 65 receives the outputs from the log amplifier through its input relay switches 167 and 168, and, as shown in FIGURE 6D, these inputs are coupled to the transistors 169–172 which form a Darlington difference amplifier served by a constant-current common emitter load transistor 173. Outputs from these preamplifier stages are fed to the output amplifier stages including transistors 174–175 and 176–177. Transistor 178 provides a constant-current source, and transistors 179 and 180 comprise constant-current sinks. Diode pair 181 clamps the output to ground, and diode pair 182 clamps the output to a predetermined small negative voltage level. If resistor 183 is adjusted so that the available current is twice that required by transistors 179 and 180, the detector operates as a two-state device. When it is adjusted to make less current than this available, an unbalance must occur in the output amplifier before the current requirements of either 179 or 180 can be satisfied. Therefore, a threshold exists, depending upon the setting of resistance 183, over which no output difference exists for a certain magnitude of input difference. Relay 184 switches the preamplifier stages to test inputs so that the threshold may be set accurately. Relay 185 is a polarity reversing relay, which reverses the outputs in leads 186 and 187 when the evaluated film is changed between positive and negative types.

A typical difference amplifier circuit is represented in FIGURE 6E, and is seen to be a two-channel amplifier including transistors 186 and 187 as a difference pair. One of the inputs 188 and 189 is coupled to the voltage reference in lead 127 of difference amplifier 58 (FIGURE 6A) and the other is coupled to the appropriate source of warning signals. Either the plus or minus output (leads 190 or 191, respectively) is connected to the base of inverter transistor 192, depending upon the desired logic. Clamping of the logic output in lead 193 is clamped to ground through diode 194 or to a predetermined small negative voltage through diode 195.

The apparatus and practices described are susceptible of modification and adaptation in numerous ways, as will be appreciated by those versed in the art. Data recorded as the result of the improved reading may be displayed on the same or another cathode ray tube device, or may be fed into further computation equipment for analyses and processing of various types. In compensating for film density variations, one or both of the electrical output signals from the phototube circuits may be selectably adjusted using electrical potentiometers or the like, either in lieu of or in conjunction with the optical compensations with neutral density filtering. It should thus be understood that the detailed descriptions and illustrations here presented are offered for purposes of disclosure, rather than limitation, and that various modifications, substitutions and combinations may be effected within the spirit of these teachings without departing from the invention in its broader aspects as defined in the appended claims.

What I claim as new and desire to secure by Letters Patent of the United States is:

1. Apparatus for the automatic evaluation of a specimen containing information discernible under scanning by light, comprising a light source including means for selectably producing illumination independently at each of a plurality of sites on a display screen, first light-responsive means for producing electrical output signals responsive to illuminations thereof, means for mounting said specimen to receive illumination from said source at different sites corresponding to said sites on said screen, means mounting said light-responsive means for response to light transmitted thereto from said specimen, second light-responsive means for producing electrical output signals responsive to illumination thereof, means mounting said second light-responsive means for response to light transmitted thereto from said display screen, optical filtering means for selectably varying the outputs of said electrical signals produced by said light-responsive means and, thereby, to compensate for disturbing effects of the visible background to the visual information of interest in said specimen, means comparing the outputs of electrical signals from said light responsive means and developing signals characterizing the relative values thereof which signify the presence of said visual information, means programming said light source to produce a scanning of illumination at the sites on said screen, and means sensing the signals developed by said comparing means and identifying their occurrences in relation to coordinates of those sites of illumination on said screen which cause them to be produced.

2. Apparatus for the automatic reading of film or the like, comprising a light source including means for selectably producing illumination independently at each of a plurality of sites on a display screen, first and second phototube means producing electrical signals responsive to light transmitted thereto, optical means directing one part of the illumination from each of said sites to corresponding discrete sites on said film and directing another part of said illumination to said second phototube means, optical means directing illumination transmitted through said film to said first phototube means, optical filtering means intercepting at least one of said parts of said illumination directed to at least one of said phototube means for selectably varying the relative electrical output signals from said first and second phototube means to compensate for film density effects, means comparing the outputs of electrical signals produced by said first and second phototube means and developing signals characterizing the relative values thereof which signify the presence of information of interest carried by said film, means programming said light source to produce a scanning of illumination at the sites on said screen, and means sensing the signals developed by said comparing means and identifying their occurrences in relation to coordinates of those sites of illumination on said screen which cause them to be produced.

3. Apparatus for the automatic reading of film or the like as set forth in claim 2 further comprising a projection light source, and means for selectably directing light from said projection source through the film and onto said display screen, said display screen being reflective of the projected light, whereby the projected images of information on the film may be compared visually with illuminated images created on said screen.

4. Apparatus for the automatic reading of film or the like as set forth in claim 2, wherein said comparing means comprises differential amplifier means including two amplifier stages each responsive to the electrical output signals from a different one of said phototube means and together developing distinctively different output signals when the output signals from said first phototube means respectively exceed and are less than a predetermined relationship to the output signals from said second phototube means.

5. Apparatus for the automatic reading of film or the like as set forth in claim 3 wherein said light source comprises a cathode ray tube device, and wherein said means for directing light from said projection source onto said screen includes a beam-splitting mirror interposed between said film and said first phototube means, said beam-splitting mirror being disposed to direct light from said projection source onto the screen of said cathode ray tube device through the film and through at least part of the same optical means which directs light from the screen onto said film and said first phototube means.

6. Apparatus for the automatic reading of film or the like, comprising a light source including means for selectably producing illumination independently at each of a plurality of discrete and minute sites on a display screen, light-responsive means for producing electrical output signals responsive to illuminations thereof, means for mounting the film intermediate said display screen and said light-responsive means to have illumination from each of said sites on said display screen impinge upon corresponding discrete sites on said film before passage to said light-responsive means, means for enlarging by a predetermined amount and then reducing the area of illumination at each of said sites on said display screen before said means for producing illumination illuminates another of said sites, means comparing electrical output signals developed by said light-responsive means when the areas of said illumination at each of said sites are relatively large and relatively small and producing signals which characterize the relative values thereof and thereby identify the presence and absence of information at predetermined visual levels at said discrete sites on said film, means programming said light source to produce a scanning of relatively large- and small-area illumination at sites on said display screen, and means sensing the signals produced by said comparing means and identifying their occurrences in relation to coordinates of those sites of illumination which cause them to be produced.

7. Apparatus for the automatic reading of film or the like as set forth in claim 6 wherein said light source comprises a cathode ray tube device, and wherein said means for enlarging and reducing the area of illumination at each of the sites on the display screen of the cathode ray tube device includes magnetic defocussing coil means for defocussing the electron beam of said cathode ray tube device, and electrical circuit means driving electrical currents through said defocussing coil means to defocus and then refocus said electron beam each time said beam is directed upon one of said sites on said screen.

8. Apparatus for the automatic reading of film or the like, comprising a scanning light source including means for selectably producing illumination independently at each of a plurality of discrete sites on a display screen, light-responsive means for producing electrical output signals responsive to illuminations thereof, first optical means directing illumination from each of said sites on said screen to corresponding discrete sites on the film, second optical means directing illumination passed through said film to said light-responsive means, a projection light source, means for selectably directing light from said projection source through the film and onto said display screen through said first optical means, said display screen being reflective of the projected light to display a projected image of information on the film, means programming said scanning light source to produce a scanning of illumination at the sites on the screen, and means responsive to the signals produced by said light-responsive means and identifying their occurrences in relation to coordinates of the corresponding sites of illumination on said display screen.

9. Apparatus for the automatic reading of film or the like as set forth in claim 8 wherein said scanning light source comprises a cathode ray tube device, wherein said light-responsive means comprises a phototube device, and wherein said means for directing light from said projection source onto said screen includes a beam-splitting mirror interposed between said film and said phototube device which passes and reflects the light from said sources along different paths.

10. The method of reading a visual record such as film or the like which comprises producing a scanning light beam, directing at least part of the light beam upon the record, producing electrical output signals related to illuminations from the beam transmitted from the film as the result of impingements of the light beam thereon, identifying the occurrences of the electrical output signals in relation to the positions of the light beam, scanning the light beam progressively across the record in one direction until it reaches a first point where the said step of producing electrical signals yield an electrical signal characterizing the presence of a continuous trace of information at a predetermined visual level on the record, then interrupting the progressive scanning when such an electrical signal is produced and immediately thereafter stepping the light beam from said point along a predetermined relatively short path which will intercept the continuous trace until another point is reached where an electrical signal is produced characterizing the presence of the trace of information, the said path including a predetermined number of steps in a first direction succeeded by a predetermined number of steps in a second direction perpendicular to the first direction and succeeded in turn by a predetermined number of steps in direction opposite to the said first direction and of number greater than the said predetermined number of steps in the said first direction, then immediately stepping the light beam from said other point along a similar relatively short path until a further point is reached, and so on until substantially all portions of the trace which are of interest are located.

11. The method of reading a visual record such as film or the like as set forth in claim 10 wherein said first and third directions of steps in the said similar path involved in immediately stepping the beam from the said other point are the reverse of the said first and third directions of steps in said predetermined path, wherein the said steps include steps perpendicular to the direction of progressive scanning across the record, and wherein the first and third directions of steps between successive characterized points on the trace are reversed and thereby establish a substantially square-wave form of scanning of the light beam following the trace as a base line.

12. Apparatus for the automatic reading of film or the like, comprising a light source including means for selectably producing illumination independently at each of a plurality of discrete and minute sites on a display screen, light-responsive means for producing electrical output signals responsive to illuminations thereof, means for mounting the film intermediate said display screen and said light-responsive means to have illumination from each of said sites on said display screen impinge upon corresponding discrete sites on said film before passage to said light-responsive means, means for enlarging by a predetermined amount and then reducing the area of illumination at each of said sites on said display screen, said means for enlarging and reducing the area of illumination at each of the sites on the display screen of the cathode ray tube device including magnetic defocussing coil means for defocussing the electron beam of said cathode ray tube device, and electrical circuit means driving electrical currents through said defocussing coil means to defocus and then refocus said electron beam each time said beam is directed upon one of said sites on said screen, said electrical circuit means including means for increasing and decreasing said driving currents substantially exponentially, means comparing electrical output signals developed by said light-responsive means when the areas of said illumination at each of said sites are relatively large and relatively small and producing signals which characterize the relative values thereof and identify the presence and absence of information at predetermined visual levels at said discrete sites on said film, said comparing means including means integrating each of said electrical output signals produced while said illumination is increased in area at each of said sites, and said comparing means comparing relative values of each of the integrated signals with the unintegrated electrical output signals produced while said illumination at the same site is of a minimum area, means programming said light source to produce a scanning of relatively large- and small-area illumination at sites on said display screen, and means sensing the signals produced by said comparing means and identifying their occurrences in relation to coordinates of those sites of illumination which cause them to be produced.

13. Apparatus for the automatic reading of film or the like as set forth in claim 12 wherein said comparing means includes a three-state difference detector having difference amplifier stages each separately responsive to said integrated signals and said unintegrated signals and, together, producing difference signals, constant-current source means, constant-current sink means, said difference amplifier stages being connected in control of flow of currents in two paths between said source means and sink means, and means responsive to the flow of currents in said two paths producing said characterizing signals.

14. Apparatus for the automatic reading of film or the like, comprising a light source in the form of a cathode ray tube device for selectably producing illumination independently at each of a plurality of sites on a display screen, first and second phototube means producing electrical signals responsive to light transmitted thereto, optical means directing one part of the illumination from each of said sites to corresponding discrete sites on said film and directing another part of said illumination to said second phototube means, optical means directing illumination transmitted through said film to said first phototube means, means for selectably varying the relative electrical output signals from said first and second phototube means to compensate for film density effects, means comparing the outputs of electrical signals produced by said first and second phototube means and developing signals characterizing the relative values thereof which signify the presence of information of interest carried by said film, means programming said light source to produce a scanning of illumination at the sites on said screen, means sensing the signals developed by said comparing means and identifying their occurrences in relation to coordinates of those sites of illumination on said screen which cause them to be produced, a projection light source producing light of spectral values different from those of the illumination from said display screen, optical filter means selectively screening said phototube means from the light from said projection source while transmitting to said phototube means illumination from said display screen, means for selectably directing light from said projection source through the film and onto said display screen, said display screen being reflective of the projected light, said means for directing light from said projection source onto said screen including a beam-splitting mirror interposed between said film and said first phototube means, said beam-splitting mirror being disposed to direct light from said projection source onto the screen of said cathode ray tube device through the film and through at least part of the same optical means which directs light from the screen onto said film and said first phototube means, and enclosure means isolating said phototube means and display screen from ambient illumination, whereby the projected images of information on the film may be compared visually with illuminated images created on said screen.

15. Apparatus for the automatic reading of film or the like, comprising a scanning light source including means for selectably producing illumination independently at each of a plurality of discrete sites on a display screen, said scanning light source comprising a cathode ray tube device, light-responsive means for producing electrical output signals responsive to illuminations thereof, said light-responsive means comprising a phototube device, first optical means directing illumination from each of said sites on said screen to corresponding discrete sites on the film, second optical means directing illumination passed through said film to said light-responsive means, a projection light source, light from said projection source being of spectral values different from those of the light from said scanning source, means for selectably directing light from said projection source through the film and onto said display screen through said first optical means, said display screen being reflective of the projected light to display a projected image of information on the film, said means for directing light from said projection source onto said screen including a beam-splitting mirror interposed between said film and said phototube device which passes and reflects the light from said sources along different paths, said second optical means including filtering means selectively screening said phototube device from light from said projection source while transmitting light from said scanning source, means programming said scanning light source to produce a scanning of illumination at the sites on the screen, and means responsive to the signals produced by said light-responsive means and identifying their occurrences in relation to coordinates of the corresponding sites of illumination on said display screen.

References Cited

UNITED STATES PATENTS

| | | | |
|---|---|---|---|
| 2,934,653 | 4/1960 | Hulst | 250—217 |
| 3,050,581 | 8/1962 | Bomba | 250—202 |
| 3,270,611 | 9/1966 | Gelernter | 88—1 |

FOREIGN PATENTS 1,315,587   12/1962   France.

ROBERT L. GRIFFIN, *Primary Examiner.*

DAVID G. REDINBAUGH, *Examiner.*

J. A. ORSINO, *Assistant Examiner.*